United States Patent [19]

Eidsvoog et al.

[11] Patent Number: 4,611,627

[45] Date of Patent: Sep. 16, 1986

[54] SELF-VENTING DRAIN VALVE

[75] Inventors: Frank H. Eidsvoog, Brooklyn Center; Sean T. Warren, Savage, both of Minn.

[73] Assignee: Donaldson Company, Inc., Minneapolis, Minn.

[21] Appl. No.: 699,021

[22] Filed: Feb. 7, 1985

[51] Int. Cl.[4] ............................................. F16K 24/00
[52] U.S. Cl. ................................... 137/588; 251/144; 222/481.5
[58] Field of Search ...................... 137/588, 212, 244; 251/339, 346, 144; 222/185, 481.5, 486; 210/443, 449, 450

[56] References Cited

U.S. PATENT DOCUMENTS

| | | | |
|---|---|---|---|
| 754,618 | 3/1904 | Smith | 137/588 |
| 922,198 | 5/1909 | Saunders | 137/578 |
| 2,046,474 | 7/1936 | Maggenti | 137/588 |
| 2,173,662 | 9/1939 | Plattring | 222/484 |
| 2,197,352 | 4/1940 | Terkel | 222/488 |
| 2,264,671 | 12/1941 | Kocher | 222/481.5 |
| 2,333,310 | 11/1943 | Greening | 137/588 |
| 2,362,379 | 11/1944 | Holveck | 222/189 |
| 2,661,018 | 12/1953 | Snyder | 137/588 |
| 2,702,563 | 2/1955 | Snyder et al. | 137/588 |
| 2,790,582 | 4/1957 | Halpern | 222/481.5 |
| 2,810,398 | 10/1957 | Carlson | 137/588 |
| 2,939,611 | 6/1960 | Nebinger | 222/131 |
| 2,992,762 | 7/1961 | Forman | 222/484 |
| 3,265,101 | 8/1966 | Shiozaki et al. | 141/295 |
| 3,419,054 | 12/1968 | Tashiro | 141/293 |
| 3,495,622 | 2/1970 | Rose | 137/588 |
| 3,727,638 | 4/1973 | Zaremba et al. | 137/572 |
| 3,746,059 | 7/1973 | Mizuguchi | 137/588 |
| 3,834,412 | 9/1974 | Fannin | 137/588 |
| 3,974,863 | 8/1976 | Frahm et al. | 222/165 |
| 4,025,048 | 5/1977 | Tibbitts | 251/144 |
| 4,109,829 | 8/1978 | Kuckens et al. | 137/588 |
| 4,440,193 | 4/1984 | Matheson | 137/588 |

FOREIGN PATENT DOCUMENTS

| | | | |
|---|---|---|---|
| 6465 | of 1928 | Australia | 137/244 |
| 2109901 | 6/1983 | United Kingdom . | |

OTHER PUBLICATIONS

"Self-Venting Valve Promotes Frequent Engine Draining", *Design News,* 12-6-82, pp. 70-72.

Primary Examiner—A. Michael Chambers
Assistant Examiner—Sheri M. Novack
Attorney, Agent, or Firm—Merchant, Gould, Smith, Edell, Welter & Schmidt

[57] ABSTRACT

A self-venting drain valve is disclosed preferably used in connection with tapping accumulated water at the bottom of a fuel/water separator. A valve having a first portion (14) residing at the bottom of a vessel (10) has a main passage (34) and a secondary passage (26), the secondary passage being provided to allow air to enter the container to eliminate a vapor-lock. A second portion (16) of the valve is threaded on the first portion (14) and forms seals (52, 48, 44). When the second portion (16) is unscrewed, the seals are broken in sequence as follows: 48, 52, 44. Accumulated water as well as some fuel will then pass through the same outlet aperture (76) to a collection container held by the operator of the valve.

7 Claims, 4 Drawing Figures

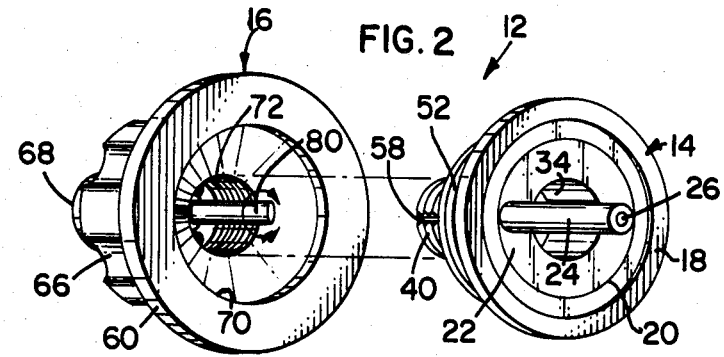
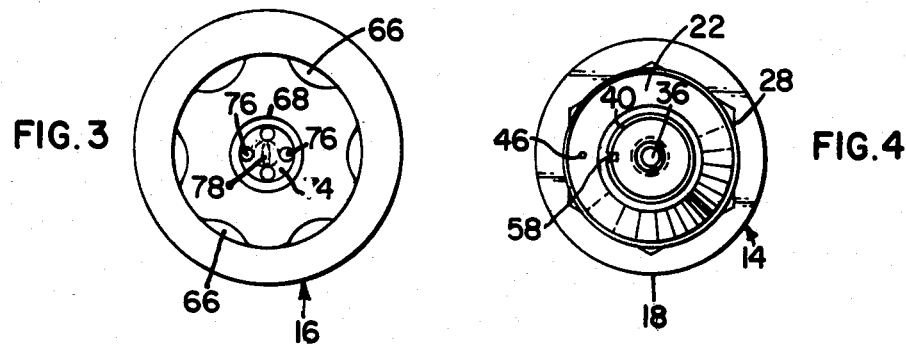

SELF-VENTING DRAIN VALVE

TECHNICAL FIELD

The present application relates to a valve assembly to be used as a drain primarily in connection with draining a liquid which is accumulated at the bottom of a sealed container in a vacuum or pressure system.

BACKGROUND OF THE INVENTION

Drain valves are certainly well known in the art and have long been used in connection with controlled drainage of accumulative liquids within containers. In a fuel/water separator, for example, it is important to drain the heavier water from the container which contains a lighter fuel atop water. One prior art device which accomplishes this task is shown in U.S. Pat. No. 4,440,193 to Matheson. In this prior art device, two passages are provided to the sealed container, one for liquid and the other for air. The purpose of these two passages is to prevent a vapor lock condition from occurring and allowing residual liquid to drain out through the liquid passage. When this prior art valve is open, the liquid passage opens first and, in a vacuum system, allows air to be drawn up through the passage creating bubbles in the accumulated water which tend to agitate the fluid at the liquid and water interface thereby mixing the two. This prevents proper drainage since the fluids are no longer separate.

The present invention solves this problem of fluid agitation during draining while allowing for relief of a vacuum which would occur during draining and preventing vapor lock. It also provides a single drain port for the collection of water which may also include fuel.

SUMMARY OF THE INVENTION

The present invention relates to self-venting drain valves for use in controlled draining of liquids in a closed container where a first member of the valve is fixed to the bottom of the container and a second member is formed to threadably engage the first member. The first member includes primary (liquid) and secondary (air) passages extending therethrough, the secondary passage having an inlet (in the case of a vacuum system, or outlet in the case of a pressure system) adjacent the primary passage. The second member includes a third passage therethrough and means are located on the first member for conducting fluids from the first and second passages through the third passage. The first and second members together form three releasable seals therebetween when threadably engaged, the first seal for preventing fluid flow from the first passage through the third passage, the second seal for preventing fluid flow from the second passage through the third passage, and the third seal for preventing fluid flow from the second passage through the passage closed by an upstream o-ring. The seals are situated such that the second seal is released before the first seal and the third seal when the second member is unthreaded.

According to a further aspect of the invention, the first seal includes a cylindrical member extending from the second member into the first passage and that member may have a planar portion which is used to break up sedimentary deposits which may occur at the bottom of this passage.

According to another aspect of the invention, the second seal includes a ridge extending outwardly from the first portion to abut the second member.

There have been outlined rather broadly the more important features of the invention in order that the detailed description that follows may be better understood and in order that the present contribution to the art may be better appreciated. There are, of course, additional features of the invention that will be described hereinafter and will form the subject matter of the claims appended hereto. Those skilled in the art will appreciate that the concepts upon which this disclosure is based may be readily utilized as a basis for designing other structures for carrying out several purposes of the invention. It is important, therefore, that the claims be regarded as including such equivalent structures as to not depart from the spirit and scope of the invention.

BRIEF DESCRIPTION OF THE DRAWINGS

In the drawings, wherein like reference numerals refer to like elements throughout the several views.

FIG. 2 is a side perspective view of an embodiment of the drain;

FIG. 3 is a bottom plan view of the drain cap; and

FIG. 4 is a bottom plan view of the spigot portion of the drain. Bottom is taken as seen in the alignment in FIG. 1.

DETAILED DESCRIPTION OF THE INVENTION

Figure 1:
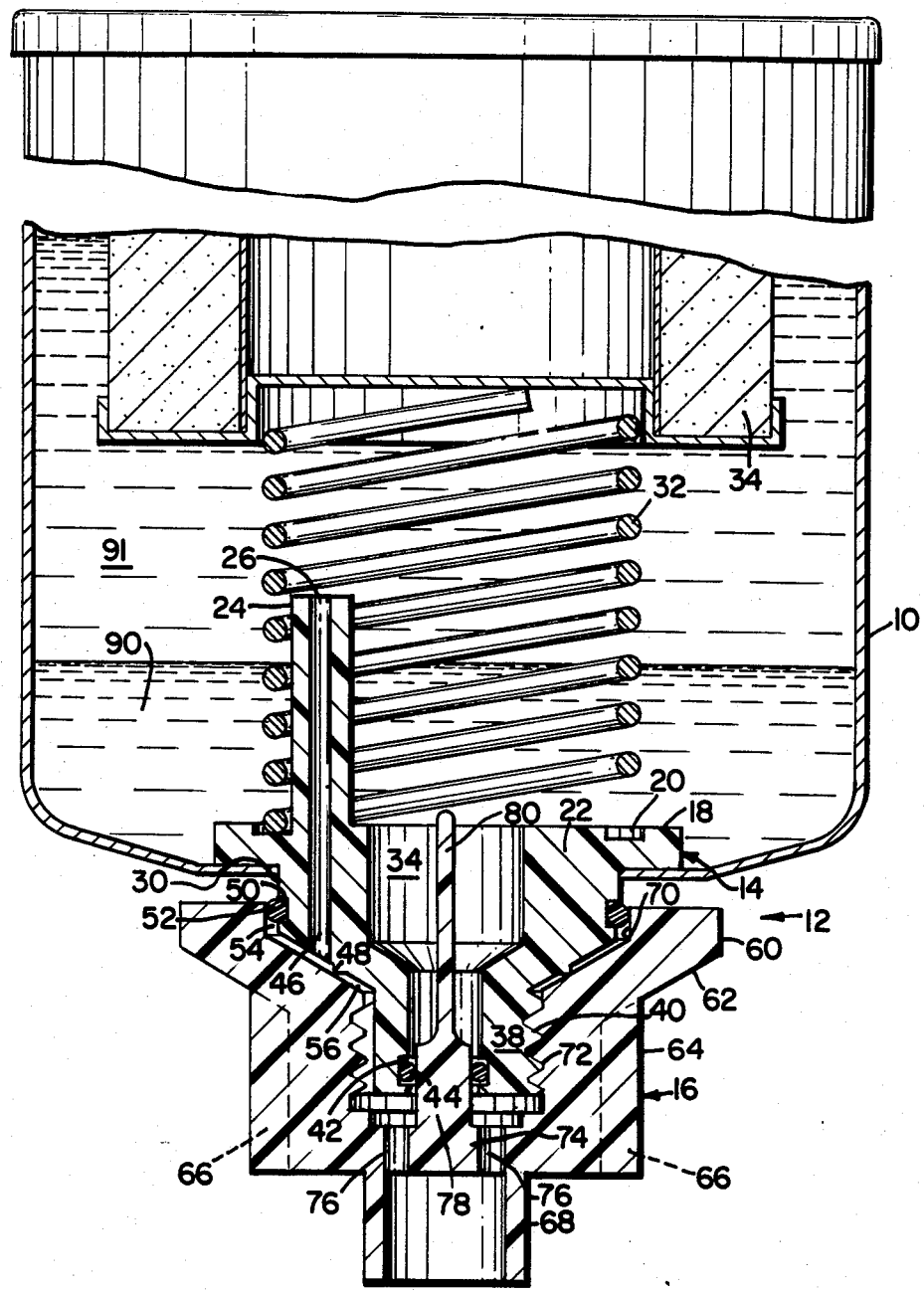
FIG. 1 is a partial cross-sectional view of a drain according to the present invention in cross section.

Referring to FIG. 1, a preferred embodiment of the present invention is shown installed within a container 10 wherein the self-venting drain valve 12 has a first portion 14 and a second threadably releasable portion 16 residing thereon. The system is intended for use in environments where the container 10 is at an elevated, lower or atmospheric pressure. Since the operation of the drain is somewhat different in various relative environments, mention is made of those differences. The first portion 14, also shown in FIGS. 2 and 4, includes a circular flange 18 having a recess 20 and a main body portion 22. In this embodiment, a standpipe 24 having inlet 26 extends upwardly from the plane defined by flange 14 and its inlet extends to open in a higher horizontal plane.

Main body 22 preferably includes a multi-sided portion 28 which engages a like shaped hole 30 in container 10. This prevents the first portion from rotating. First portion 14 is maintained biased against the bottom of container 10 by means of spring 32 which likewise holds filter element 34 upward. Adhesive (not shown) can also be used to maintain first portion 14 in fluid tight contact with the container.

Passage 26 in standpipe 24 extends through the main body portion and has an outlet 46. Adjacent the outlet is a ridge 48 extending outwardly from body 22 and positioned to form a seal when second part 16 is threaded thereon. Body 22 also includes a depression 50 with an o-ring 52 located upstream of outlet 46 and situated to form an additional seal with second portion 16. A passageway 54 exists between o-ring 52 and ridge 48. A further passageway 56 exists downstream of ridge 48 and through a groove 58 (shown in FIGS. 2, 4) in threads 40 so that in a pressure system, fluids in the standpipe can ultimately be guided to outlets 76 when seal 48 only is removed. In a vacuum system air will enter the container through the standpipe.

Portion 14 includes the fluid drain passage 34 which extends through the portion to the outlet end 36. This passage is formed by cylindrical section 38 which has threads 40 on its outer periphery. Toward the outlet 36 and within the passage 34, is located a recess 42 having an o-ring 44 used for sealing the passage.

Turning to second portion 16 of the valve, the outer features include a cylindrical portion 60, a conical portion 62 and a further cylindrical portion 64 which preferably includes depressions 66 (see FIGS. 2 and 3) which aid in rotating the knob. Finally, a cylindrical portion 68 of narrower diameter forms the outlet thereof.

Looking at the interior of second portion 16, cylindrical portion 60 has a like cylindrical inner surface 70 which forms a seal with o-ring 52 when so engaged. On the interior of portion 16 from 70 to 72 there is formed a conical portion which seals against ridge 48 of portion 14 when the portions are threaded together. Cylindrical portion 64 includes threads 72 sized to engage threads 40 on the other part of the valve. Approximately adjacent the interface between cylindrical portions 64 and 68, is located the outlet drain plate 74 having a plurality of apertures 76 therein and a axially oriented member 78 extending therefrom. At the upper portion of the axial member 78, is preferably located a planar member 80 which rotates when portion 16 is unthreaded. This planar member 80 extends upwardly well into and through passage 34 and forms the sediment breaking device which frees the passage by rotation in the event particulate matter has accumulated at the bottom. Portion 80 may be formed of many shapes including non-cylindrical, semi-circular, paddle, corkscrew, etc., the only requirement being that it assist in freeing the passage. Member 78 is sized to engage o-ring 44 to create a seal therewith.

In order to achieve optimum operation of this valve, it is desirable to have each of the three seals disengage in a particular sequence. The preferred sequence is as follows: the seal created by ridge 48, then the seal created by o-ring 52, and finally the seal created by o-ring 44. All three seals should be broken before threads 40 and 72 are fully disengaged. It is, however, not required that the seal at 52 break before 44 but is desirable in a vacuum system. This means that the second portion 16 need never be removed from the system during normal operations.

The invention works as follows. In a fuel/water separator, for example, water 90 being heavier than fuel 91 will separate from and accumulate at the bottom of the container. In the preferred embodiment, the standpipe 24 extends above the fuel/water interface. When portion 16 is unthreaded, the only seal is broken at ridge 48 causing air to rush through passage 56 and up the standpipe and bubble into the fuel level. This bubbling may be quite turbulent and it is therefore advantageous that the standpipe extend into the fuel area so as not to mix the fluid at the fuel/water interface. By allowing air to rush into the standpipe, in a vacuum system, vacuum will then be neutralized allowing the water to drain out through main passage 34 at the appropriate time after the valve is opened further. In a pressure system, liquid would escape through the standpipe until equilibrium was established and then the system would operate as per above.

As the second portion 16 is further unthreaded, the seals at o-rings 52 and 44 are broken. Water will then flow only down through liquid passage 34, past opened o-ring seal 44, through apertures 76 and out of the valve. Air will replace the drained liquid by flowing either past opened o-ring seal 52, along passage 54 and up through air vent 26, or up through apertures 76, groove 58 in threads, passage 56, past opened seal at ridge 48 and up through air vent 26.

The planar portion 80 will have broken any sediment which would have clogged the passage.

The operator of the valve will watch the outflow to determine when the majority of water has been tapped off by noticing the amount of fuel leaving the outlet. When the mixture is almost entirely fuel, it means that almost all of the water is gone and it is time to reseal the valve by rotating in the opposite direction. It can be appreciated that the operator should locate a collection vessel under apertures 76 to catch the residue, however it is apparent that the operator will not become contaminated with the fluid from the filter since it will all pass predictably through these apertures.

Numerous characteristics and advantages of the invention have been set forth in the foregoing description, together with the details of the structure and function of the invention. The novel features thereof are pointed out in the appended claims. The disclosure, however, is illustrative only, and changes may be made in detail, especially in matters of shape, size and arrangement of parts within the principle of the invention to the full extent intended by the broad general meaning of the terms in which the appended claims are expressed.

We claim:

1. A self-venting valve for use in controlled draining of liquids in a closed container comprising:

a first member affixed to said container and a second member formed to threadably engage said first member, said first member including primary and secondary passages extending therethrough, said secondary passage extending through said first member, said second member including a third passage therethrough, means on said first member for conducting fluids from said secondary passage through said third passage, said first and second member together forming first, second and third seals therebetween, said first member having a cylindrical upper portion, a tapered portion extending downwardly therefrom, and a threaded cylindrical portion extending downwardly from said tapered portion, said second member having a cylindrical upper portion, a tapered portion extending downwardly therefrom, and a threaded cylindrical portion extending downwardly from said tapered portion and sized to engage said threaded portion on said first member, a first seal between said first and second members for restricting the passage of fluids from said first to said third passage, said seal being releasable by partially unscrewing said second member from said first member, a second seal located between said first and second members along said tapered portions, said second seal being configured so that unscrewing of said first and second members will break said second seal before said first seal, a third seal located between said first and second member along said cylindrical portions, said third seal being configured so that unscrewing of said first and second members will break said third seal before said first seal, said secondary passage terminating at its lower end on said first member between said second and third seals on said tapered portion, and fourth passage means extending through at least one of said threaded portions and ending adjacent said third passage so that when said second and third seals are broken, a path of fluid communication will exist between the interior of the container and said third passage, allowing equalizing of pressures inside and out of the container.

2. A valve according to claim 1 wherein said second and third seals are configured such that said third seal will break before said second when said first and second members are unscrewed.

3. A valve according to claim 1 wherein said third passage includes a perforate planar member thereacross and wherein said first seal includes a cylindrical plug element affixed to said perforate member and sized to be received in sealable engagement with said primary passage when said first and second members are screwed together.

4. A valve according to claim 1 wherein said second seal includes a circumferential ridge extending orthogonally from one of said tapered portions.

5. A valve according to claim 2 wherein said third seal blocks the passage of ambient air from passing through said secondary passage and into said container.

6. A valve according to claim 5 wherein said first member includes a non-cylindrical flange and wherein said container includes a recess of like shape to said flange, so that said first member and said container are prevented from rotating relative to each other when said second member is rotated.

7. A valve according to claim 6 wherein said secondary standpipe includes a vertical standpipe physically remote from said primary passage and having an opening on a different horizontal parallel plane therewith.

* * * * *